(12) United States Patent
Reed

(10) Patent No.: US 8,370,086 B2
(45) Date of Patent: Feb. 5, 2013

(54) SYSTEM AND METHOD FOR DETERMINING WEDGE TIGHTNESS

(75) Inventor: Francis Alexander Reed, Princetown, NY (US)

(73) Assignee: General Electric Company, Schenectady, NY (US)

( * ) Notice: Subject to any disclaimer, the term of this patent is extended or adjusted under 35 U.S.C. 154(b) by 412 days.

(21) Appl. No.: 12/793,968

(22) Filed: Jun. 4, 2010

(65) Prior Publication Data

US 2011/0301874 A1     Dec. 8, 2011

(51) Int. Cl.
*G01L 1/00* (2006.01)
(52) U.S. Cl. .......................................................... 702/41
(58) Field of Classification Search .................... 702/41; 73/12.09
See application file for complete search history.

(56) References Cited

U.S. PATENT DOCUMENTS

| | | | |
|---|---|---|---|
| 4,422,320 A | 12/1983 | Moorby et al. | |
| 5,012,684 A * | 5/1991 | Humphries | 73/865.8 |
| 5,295,388 A * | 3/1994 | Fischer et al. | 73/12.09 |
| 5,524,474 A * | 6/1996 | Lavallee et al. | 73/12.09 |
| 6,069,473 A | 5/2000 | Hatley | |
| 6,631,335 B2 | 10/2003 | Lusted et al. | |
| 7,112,909 B2 | 9/2006 | Swartout et al. | |
| 7,201,055 B1 | 4/2007 | Bagley et al. | |
| 2006/0283234 A1 | 12/2006 | Fischer et al. | |
| 2007/0277630 A1 | 12/2007 | Bagley et al. | |
| 2008/0087113 A1 | 4/2008 | Bagley et al. | |
| 2009/0243419 A1 | 10/2009 | Humphries et al. | |
| 2009/0301168 A1 | 12/2009 | Moore | |
| 2012/0026482 A1 * | 2/2012 | Dailey | 356/43 |

* cited by examiner

*Primary Examiner* — Jonathan C Teixeira Moffat
*Assistant Examiner* — Xiuquin Sun
(74) *Attorney, Agent, or Firm* — James W. Pemrick; Ernest G. Cusick; Frank A. Landgraff

(57) ABSTRACT

A system and method for determining wedge tightness in a dynamoelectric machine is provided. The dynamoelectric machine includes a rotor, stator and a wedge assembly having at least one wedge for retaining a coil. The system includes a force application device for applying a predetermined force or a known quantity of force to a wedge, and the force is applied in a substantially radial direction. A measuring device for measuring movement of the wedge, measures a movement distance relative to a surface of an adjacent core surface. The system can be inserted between the rotor and the stator, and the movement distance is obtained by evaluating a distance to an adjacent core surface and a distance to a surface of the wedge.

17 Claims, 5 Drawing Sheets

SYSTEM AND METHOD FOR DETERMINING WEDGE TIGHTNESS

BACKGROUND OF THE INVENTION

The invention relates generally to the assessment of the condition of dynamoelectric machines. More particularly, the invention relates to a system and method for measuring or determining the tightness of wedges in dynamoelectric machines, particularly electric generators.

Dynamoelectric machines such as electric generators include a rotor and a stator. Rotors are generally constructed from a steel forging and include a number of slots that run the length of the rotor. Rotors are electrically wound by placing conductors referred to as rotor windings into the slots of the rotor.

Stators are generally constructed from a number of stacked, metal laminations. Stators also include slots, which run the length of the stator. Stators are electrically wound by placing conductors known as stator coils into the armature slots of the stator.

Conventional stator coils are frequently held in place in stator slots using a retention assembly such as a stator wedge assembly including a stator wedge, a top retaining ripple spring, and one or more shims. In this configuration, a stator coil is placed into an armature slot, a shim is placed above the stator coil, a top ripple spring is placed above the shim, and a stator wedge having a beveled edge is driven into a groove near the head of the armature slot, securing the stator coil, the shim, and the top ripple spring. The top ripple spring provides compressive force to keep the stator coils held firmly in the armature slot.

Over time and during use of the dynamoelectric machine, stator wedges may become loose. If a stator wedge becomes loose, it can permit a stator coil to vibrate, which can cause catastrophic failure in an electric generator. In order to avoid such vibration, it is desirable to periodically inspect the tightness of the wedge assembly. Such inspections present a challenge, because the wedge assembly is difficult to access within a generator.

There are a number of conventional approaches to inspecting the compression of wedge assemblies. One approach involves manually tapping the stator wedges. This method includes tapping the stator wedge and feeling or listening to the response therefrom to make a judgement on stator wedge tightness. This method depends on the experience of the technician doing the measurement and is extremely subjective.

Another approach involves measuring the depth of the surface of ripple springs through pre-formed test holes in the wedge. This method uses a depth gauge to take measurements through pre-formed test holes, and is time consuming and only possible in generators having stator wedges with pre-formed test holes. Many generators do not have such pre-formed test holes. In order to use this method on existing generators without test holes in the stator wedges, the units must be rewound using wedges with access holes.

BRIEF DESCRIPTION OF THE INVENTION

A first aspect of the invention provides a system for determining wedge tightness in a dynamoelectric machine. The dynamoelectric machine includes a rotor, stator and a wedge assembly having at least one wedge for retaining a coil. The system includes a force application device for applying a predetermined force or a known quantity of force to a wedge, and the force is applied in a substantially radial direction. A measuring device for measuring movement of the wedge, measures a movement distance relative to a surface of an adjacent core surface. The system can be inserted between the rotor and the stator, and the movement distance is obtained by evaluating a distance to an adjacent core surface and a distance to a surface of the wedge.

Another aspect of the invention provides a dynamoelectric machine including a rotor and a stator surrounding the rotor. A system for determining wedge tightness can be inserted between the rotor and stator. The system for determining wedge tightness includes a force application device for applying a predetermined force or a known quantity of force to a wedge, and the force is applied in a substantially radial direction. A measuring device measures movement of the wedge, and a movement distance is measured relative to an adjacent core surface. The system can be inserted between the rotor and the stator, and the movement distance is obtained by evaluating a distance to an adjacent core surface and a distance to a surface of the wedge.

A still further aspect of the invention provides a method for determining the tightness of a wedge assembly in a dynamoelectric machine. The method includes placing a system for determining wedge tightness between a stator and a rotor of the dynamoelectric machine. The placing includes positioning the system for determining wedge tightness between the stator and rotor without removing the rotor from the dynamoelectric machine. Additional steps measure a distance to a surface of a wedge, measure a distance to a core surface adjacent to the wedge, and apply a known quantity of force to the wedge. This can be followed by evaluating the difference between the distance to a surface of the wedge and the distance to a core surface to determine an amount of wedge movement. Another step determines if the wedge has moved at least a predetermined amount, and if the wedge has not moved at least the predetermined amount then the applying and evaluating steps can be repeated. However, if the wedge has moved at least the predetermined amount then the quantity of force required to move the wedge at least the predetermined amount is identified. The amount of force required to move the wedge at least the predetermined amount is an indication of the tightness of the wedge.

These and other aspects, advantages and salient features of the invention will become apparent from the following detailed description, which, when taken in conjunction with the annexed drawings, where like parts are designated by like reference characters throughout the drawings, disclose embodiments of the invention.

DETAILED DESCRIPTION OF THE INVENTION

At least one embodiment of the present invention is described below in reference to its application in connection with the operation of a dynamoelectric machine. Although embodiments of the invention are illustrated relative to a dynamoelectric machine in the form of a generator, it is understood that the teachings are equally applicable to other electric machines including, but not limited to motors. Further, at least one embodiment of the present invention is described below in reference to a nominal size and including a set of nominal dimensions. However, it should be apparent to those skilled in the art that embodiments of the present invention are likewise applicable to any suitable generator and/or engine. Further, it should be apparent to those skilled in the art that embodiments of the present invention are likewise applicable to various scales of the nominal size and/or nominal dimensions.

As indicated above, aspects of the invention provide a system and method for determining wedge tightness in a wedge assembly of a generator. FIGS. 1-4 show different aspects of an electric generator and configurations providing for a system for determining wedge tightness.

Figure 1:
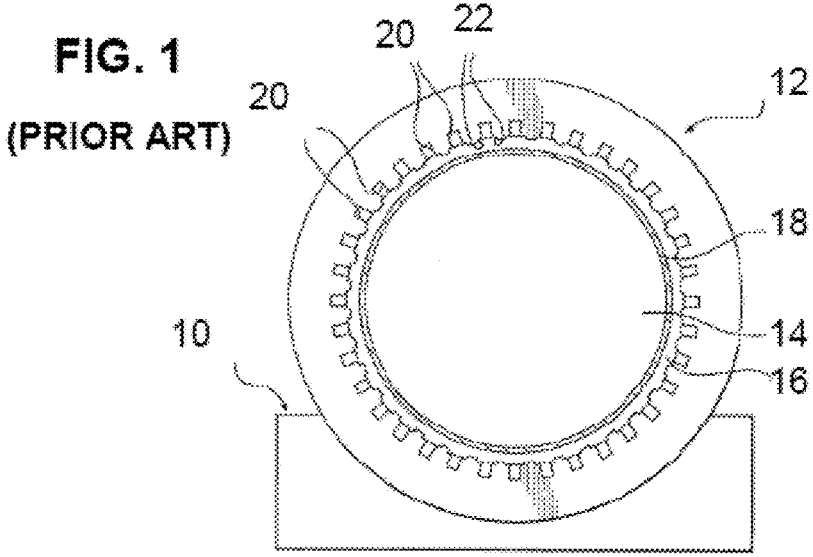
FIG. 1 shows a diagrammatic cross sectional view of a conventional electric generator having a rotor installed within a stator.

FIG. 1 shows a cross sectional view of a conventional electric generator or dynamoelectric machine 10, including a stator 12 surrounding a rotor 14. A narrow radial gap 16 exists between the stator assembly 12 and retaining ring 18 or rotor 14. The retaining ring 18 can be disposed about a portion of rotor 14. In some generators, radial gap 16 may be as narrow as about 3.8 cm (about 1.5 inch), although it may be either wider or narrower in various embodiments. Stator 12 includes an annular array of axially extending armature slots 20, each of which may be formed in stator 12 with a stator tooth 22 formed on either side thereof.

Figure 2:
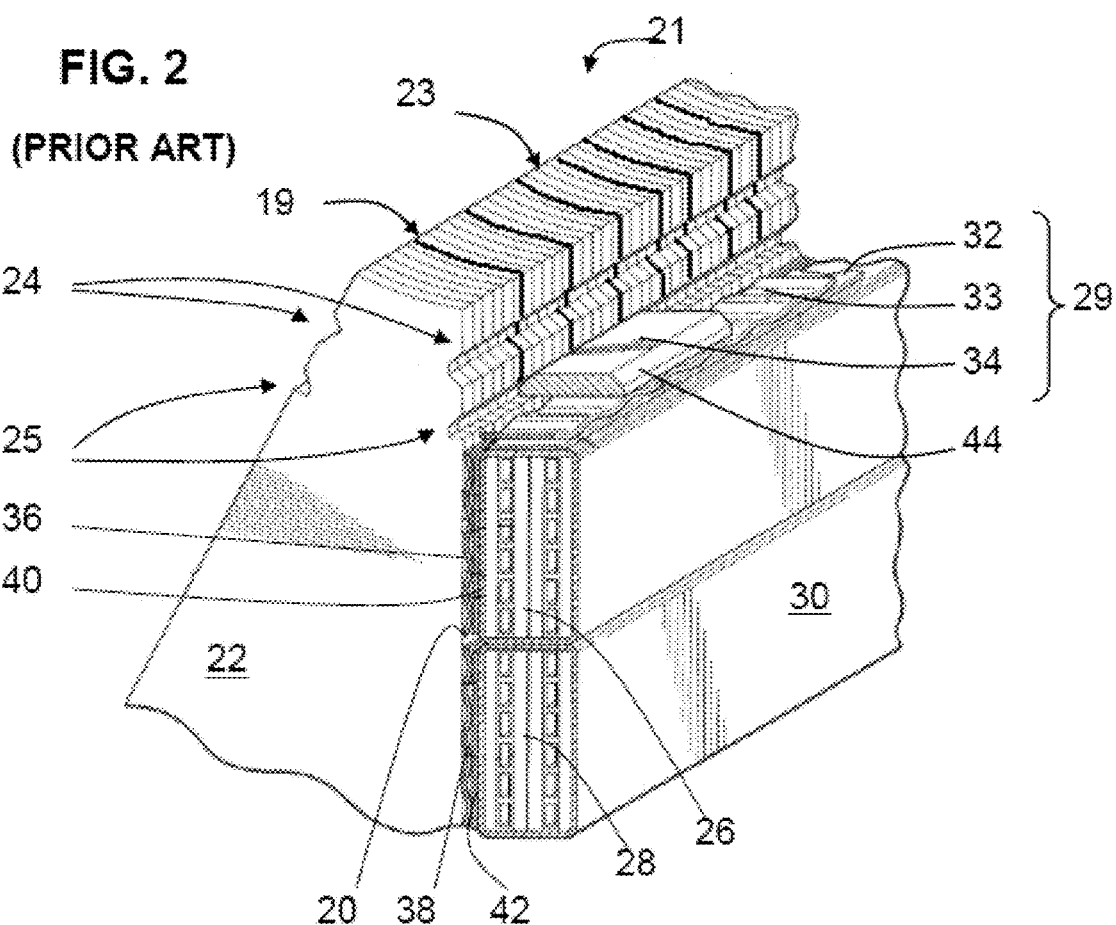
FIG. 2 shows a partial isometric view of a conventional stator in an electric generator as depicted in FIG. 1.

As shown in FIG. 2, each stator tooth 22 can be made of a plurality of punchings or laminations 23, and may include a pair of axially extending grooves 24, 25 which are radially disposed with respect to each other. Thus, each armature slot 20 typically includes two pairs of generally parallel grooves 24, 25 formed therein. Stator coils 26, 28, which may be partially or wholly wrapped in an insulation layer 30, are disposed in each of the armature slots 20 of stator 12. In a typical stator 12, a pair of stator coils 26, 28 is stacked within each armature slot 20, one radially disposed on top of the other. However, in other embodiments the stator tooth may have only one groove.

Stator coils 26, 28 are retained in armature slots 20 by wedge assembly 29. In some embodiments, wedge assembly 29 may be in the form of a stator wedge assembly, although any other type of wedge assembly may be used to retain coils 26, 28 in armature slots 20. As shown in FIG. 2, wedge assembly 29 may include a filler member, such as shim 32; a retaining ripple spring 33; and a wedging member or wedge 34. One or more shims 32 are typically placed radially inwardly from the top stator coil 26. Retaining ripple spring 33 may be disposed within the armature slot 20 radially inwardly from shim 32. Retaining ripple spring 33 may be made of, for example, glass fiber roving fabric bonded with a high temperature resistant synthetic resin matrix.

As further shown in FIG. 2, a filler member such as a first side ripple spring 36 may be disposed in armature slot 20, perpendicular to retaining ripple spring 33, between top stator coil 26 and stator tooth 22. Another filler member such a second side ripple spring 38 may be disposed in armature slot 20 perpendicular to retaining ripple spring 33 between bottom stator coil 28 and stator tooth 22. Optionally, one or more additional filler members such as first and second side slot fillers or shims 40, 42 may be placed between the side ripple springs 36, 38 and the respective stator coils 26, 28. Alternatively, side shims 40, 42 may be placed in armature slot 20 between stator tooth 22 and stator coils 26, 28 without side ripple springs 36, 38. Side ripple springs 36, 38 and side shims 40, 42 are designed to fill any axial gap that is created between stator coils 26, 28 and stator tooth 22 and to increase tightness between stator coils 26, 28 and stator tooth 22 in the tangential direction.

One or more wedges 34 may be installed within armature slot 20 radially inwardly from retaining ripple spring 33. Wedge 34 typically has beveled edges 44 which engage correspondingly shaped grooves 24, 25 in the side walls of stator tooth 22. Wedge 34 is installed by sliding the wedge 34 into at least one of parallel grooves 24, 25. Wedge 34 compresses retaining ripple spring 33 against shim 32, which is in turn compressed against top stator coil 26 to tightly secure stator coils 26, 28 radially within armature slot 20. In another embodiment, retaining ripple spring 33 may be located between wedge 34 and insulated stator coil 26 without shim 32 present.

Over time, retaining ripple spring 33 can lose resiliency such that the wedge 34 can become loose, permitting coils 26, 28 to vibrate. Such vibration of coils 26, 28 can result in damage to coils 26, 28 and failure of coil insulation 30. Inspection of wedge assembly 29 is therefore desirable to identify a need for corrective action before this occurs.

Figure 3:
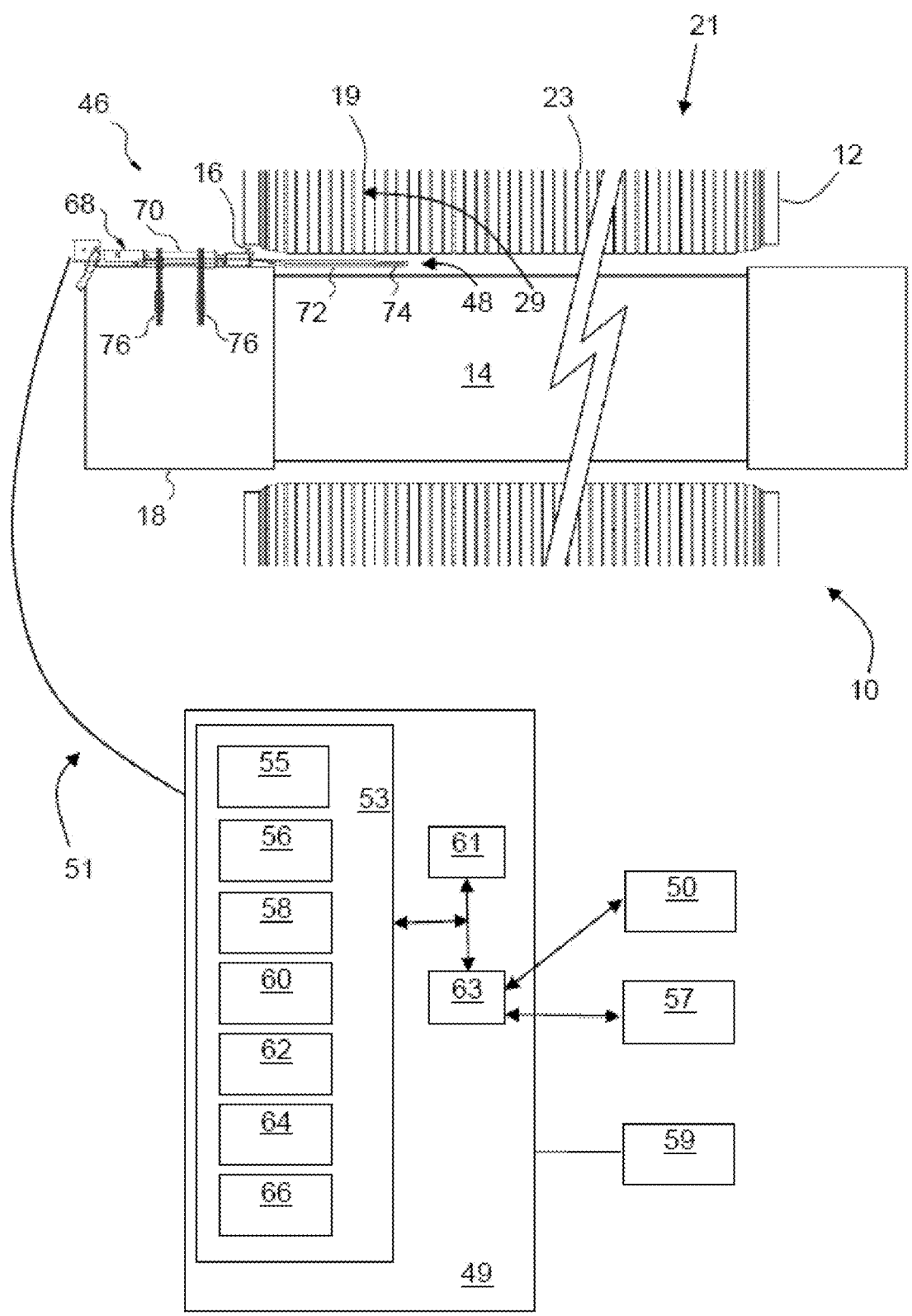
FIG. 3 shows a side plan view of a robotic manipulator positioned in a generator in accordance with an aspect of the invention.

As shown in FIG. 3, a system 46 is provided herein for inspecting the wedge assembly and for determining wedge tightness. Wedge inspection system 46 includes a force application and measuring device 48 for applying force to and measuring movement of wedge 34. In one embodiment, force application and measuring device 48 may be include a bar jacking device and a linear voltage displacement transducer (LVDT). Where wedge inspection system 46 is used to inspect retention assembly 29, force application and measuring device 48 is insertable into the gap between the rotor 14 and stator 12.

The wedge inspection system 46 is linked via coupler 51 to computer system 49. As shown, computer system 49 includes a processor 61, a memory 53, and input/output (I/O) interfaces 63 operably connected to one another. Further, computer system 49 is shown in communication with display 50, external I/O devices/resources 57, and storage unit 59. Display 50 displays the status of and/or the results of the wedge inspection process. I/O devices 57 may include any type of user input device such as a mouse, keyboard, joystick, or other selection device. In general, processor 61 executes computer program code, which provides the functions of computer system 49. These modules, including device controller 55, measurer 56, calculator 58, force load determinator 60, wedge tightness determinator 62, comparator 64, and estimator 66, are stored in memory 53 and/or storage unit 59, and perform the functions and/or steps of the present invention as described herein. Memory 53 and/or storage unit 59 can comprise any combination of various types of data storage media that reside at one or more physical locations. To this extent, storage unit 59 could include one or more storage devices, such as a magnetic disk drive, solid-state memory or an optical disk drive. Still further, it is understood that one or more additional components not shown in FIG. 3 can be included in computer system 49. Additionally, in some embodiments one or more external devices 57, display 50, and/or storage unit 59 could be contained within computer system 49, and not externally as shown.

As noted, computer system 49 includes a measurer 56 that can be used for calculating a distance from force application and measuring device 49 to the surface of wedge 34 and the surface of the stator core 22. Measurer 56 may include a computer-based analysis algorithm or logic for determining distances. In another embodiment, this logic may reside in memory 53 on computer 49, which receives data collected by force application and measuring device 48. Following collection and measuring, data may be archived, reported, and stored in memory 53 and/or in storage unit 59.

Computer system 49 further includes a calculator 58 for calculating various distances. The distance from force application and measuring device 49 to the surface of wedge 34 and the surface of the stator core 22 can be calculated. The difference between the two distances can also be calculated and used as an indication of the relative movement of wedge 34.

Computer system 49 further includes a force load determinator 60 for determining a value of load placed on wedge 34 in units of force. The known load or quantity of force versus deflection or movement correlation may be in the form of a load versus deflection curve. Such a load versus deflection curve may be readily available as a technical data characteristic of a commercially available wedge assembly 29. Computer system 49 further includes wedge member tightness determinator 62 for determining a tightness of wedge 34 in units of force per unit length. The tightness of wedge 34 may be calculated by evaluating the amount of force required to move the wedge a predetermined amount (e.g., 1 mm). Thus, tightness of wedging member 34 may be expressed in units of force or any other suitable representation.

Computer system 49 further includes a comparator 64 for comparing the quantity of force required to move wedge 34 the predetermined amount to a design requirement value for wedge assembly 29. Estimator 66 may then estimate a remaining safe operation time, based on this value or successive values, and an estimated remaining operation time until the wedge assembly 29 may exceed the design requirement value.

Figure 4:
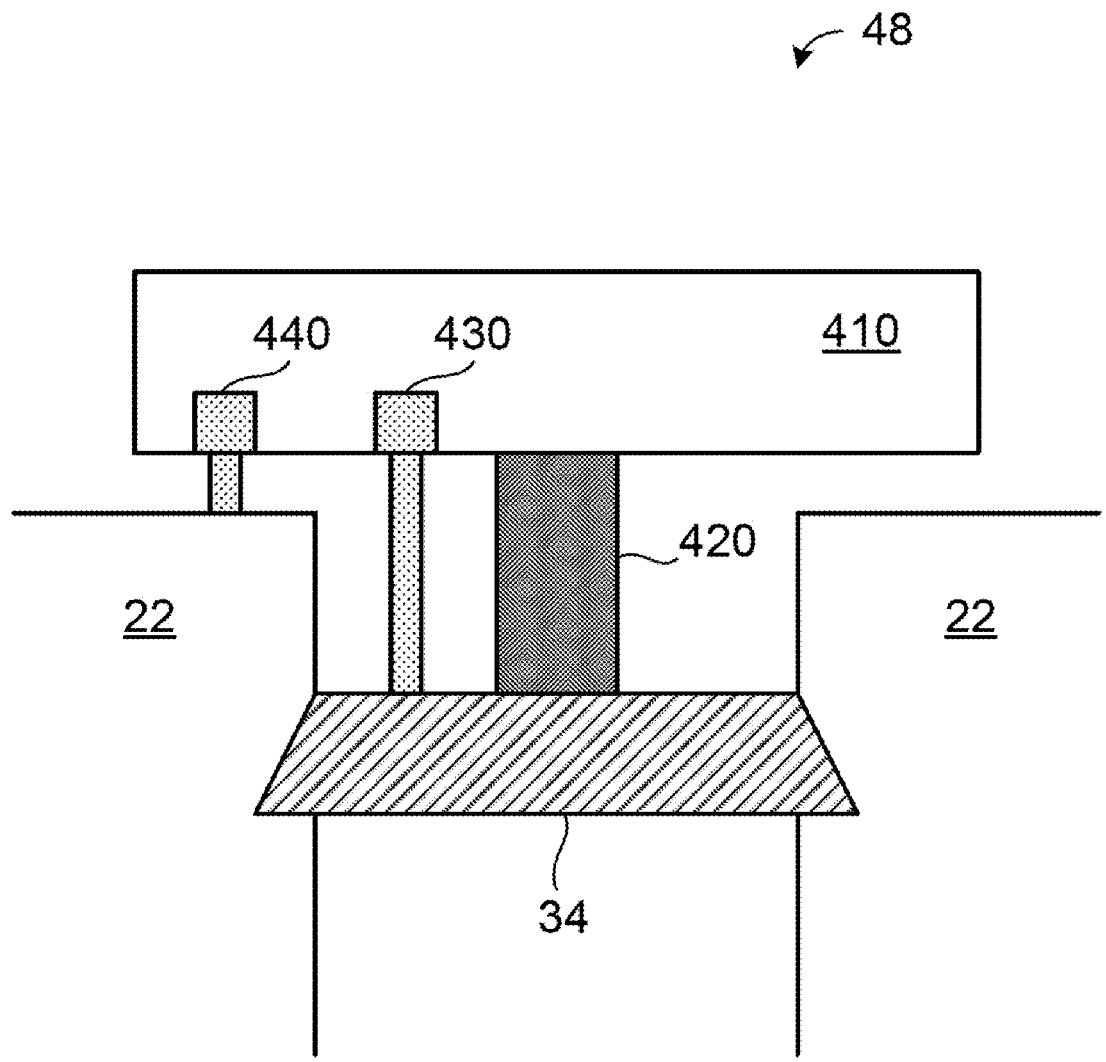
FIG. 4 shows a cross sectional view of a portion of a wedge assembly and the system for determining wedge tightness in accordance with an aspect of the invention.

FIG. 4 illustrates a cross-sectional view of a portion of wedge assembly 29 and the system for determining wedge tightness. The wedge 34 is disposed between opposing grooves in stator core 22. The force application and measuring device 48 includes a main body 410, a force application device 420 and one or more distance measuring devices 430 and 440.

Figure 5:
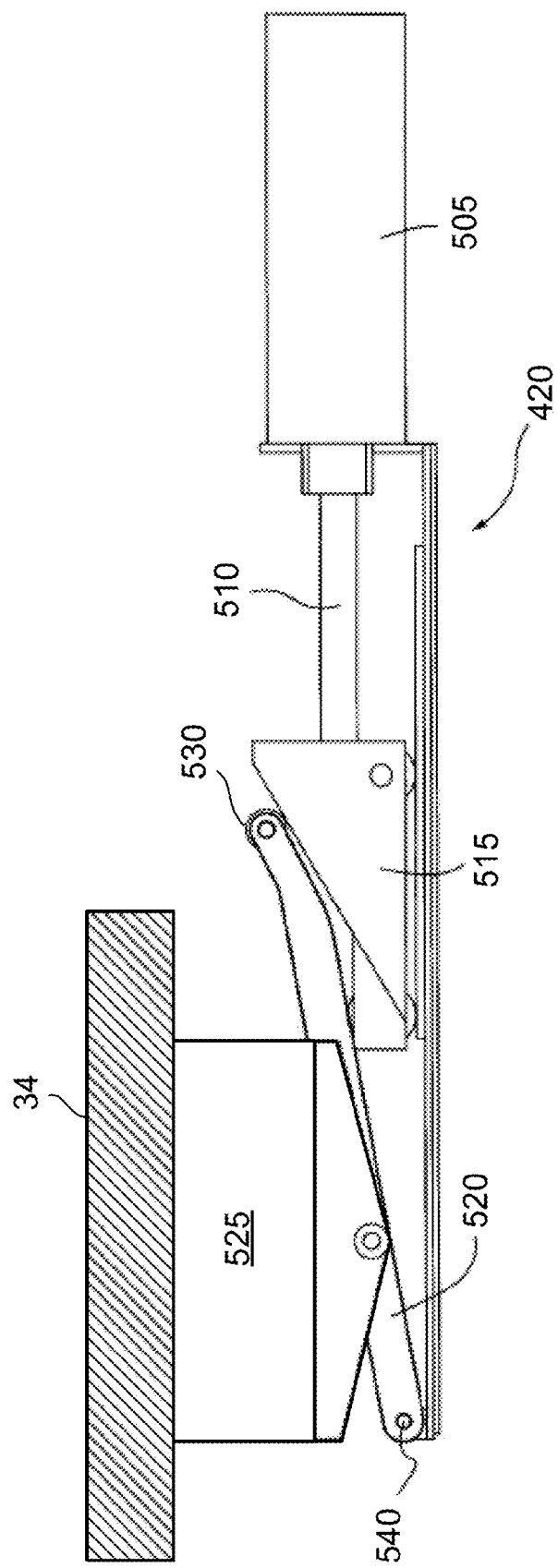
FIG. 5 shows a cross sectional view of a portion of a force application device in accordance with an aspect of the invention.

The force application device 420 applies a predetermined force or a known quantity of force in a generally radial direction to wedge 34, and could be comprised of a bar jacking apparatus. A bar jacking apparatus, shown in FIG. 5, may include a wedge driver 505 such as a pneumatic ram including a driving piston 510. A wedging member 515 is coupled with the driving piston 510 and includes wheels riding on a steel plate or other suitable surface to facilitate positioning and driving of the wedging member 515. A lifting arm 520 is movably engaged at a first end with the wedging member 515 for example by a wheel, and is fixed at a second end by a pivot 540. The lifting arm 520 supports the barjacking head 525 at an intermediate portion such as a pivot between the first and second ends.

As the wedge driver 505 drives the wedging member 515 via the piston 510, the wheel 530 of the lifting arm 520 is urged upward by the wedging member 515, thereby raising the barjacking head 525 correspondingly into the wedge 34. The wedge driver is controlled to apply a predetermined amount of force to the wedge 34. In preferred forms, the force is about 100 pounds per inch length of contact between the device and the bar. In practice, the movement of the wedging member 515 is very small, since the acceptable movement of the bar is typically only a few thousandths of an inch. The actual allowable deflection varies from generator to generator. In one embodiment, the jacking force is determined by the air pressure applied to the wedge driver 505. In an alternative arrangement, a load sensor is inserted between the wedging member 515 and the piston 510 so that a more direct determination of load may be made.

Referring back to FIG. 4, a measuring device 440, 430 is used to measure the distance to the wedge 34 and stator surface 22. For example, the measuring device 430 measures the distance to the wedge 34. The measuring device 440 measures the distance to the surface of stator 22. The relative movement of wedge 34, due to application of force, can be determined by subtracting the distance measured by device 430 from the distance measured from device 440. This method can reduce any errors caused by motion of the stator, rotor or force application and measuring device 48 during a measurement process.

Figure 6:
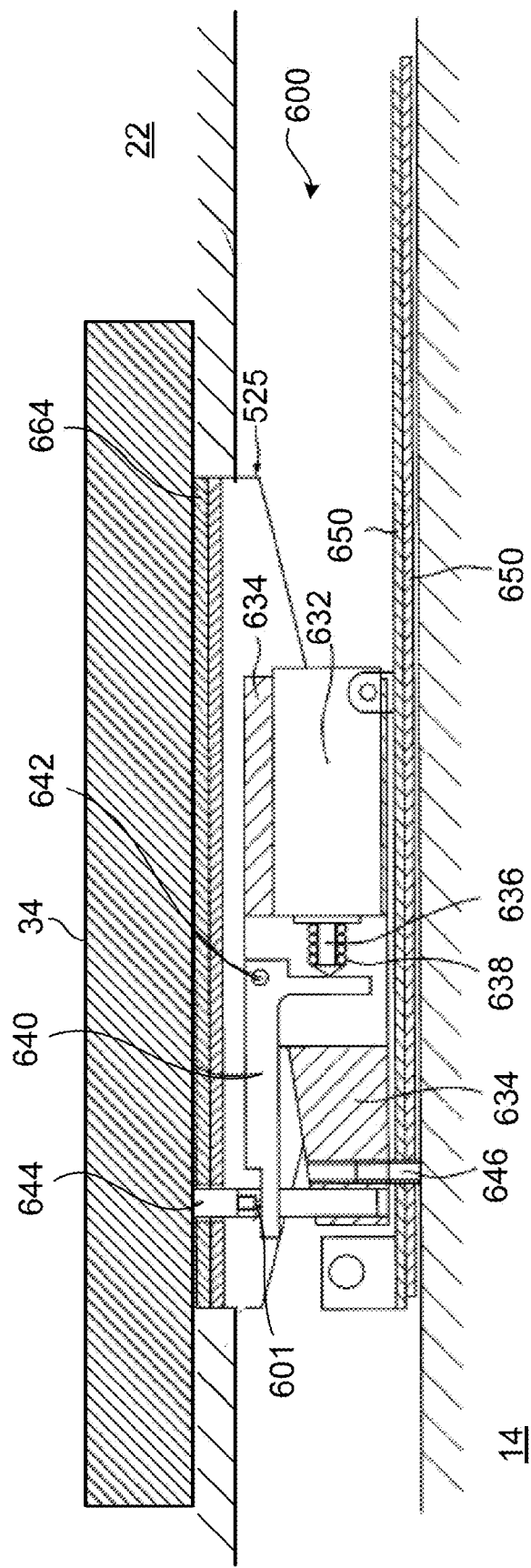
FIG. 6 shows a cross sectional view of a measuring device in accordance with an aspect of the invention.

Referring to FIG. 6, the measuring device 600 can be cooperatively engaged with a portion of the barjacking head 525, which is attached to the force application device 420 and positioned between the stator 22 and the rotor 14. The measuring device 600 can include a linear voltage displacement transducer (LVDT) 632 secured to a frame 634. An LVDT is a device for accurately measuring small distances. In this context, the LVDT 632 includes a spring biased displacement measuring arm 636 that is biased outward by a compression spring 638 disposed over the spring biased displacement measuring arm 636. The LVDT communicates with a measuring control unit (not shown) to process the measured distances. In other aspects of the present invention, the measuring devices 430, 440 could be optical distance measuring devices.

The displacement measuring arm 636 engages a pivot bracket 640, which is attached to the frame 634 and pivots about a pivot 642. A bar sensor 644 is attached at an opposite end to a cross pin 601 of the pivot bracket 640 and is urged (upward in FIG. 6) toward engagement with the wedge 34. As shown in FIG. 6, the bar sensor 644 can extend through the barjacking head 525 to engage the wedge 34. A compliant pad 664 can be provided on an upper surface of the barjacking head 525 to minimize localized stressing of the wedge 34. The compliant pad 664 is preferably formed of high-density polyethylene (HDPE) for this purpose. Of course, other materials may be used such as urethane, and the invention is not meant to be limited to HDPE. The frame 634 is pivotally mounted to a barjacking chassis 650. A retaining ring sensor 646 can be secured to the frame 634 and extends through a hole in the chassis.

In a preferred aspect, a first measuring device 430 measures the distance to a surface of the wedge 34, and a second measuring device 440 measures the distance to an adjacent or nearby surface of stator core 22. Initial readings can be obtained to calculate a "zero" or baseline reading. A predetermined known force can be applied to wedge 34 via force application device 420 and the movement, or lack thereof, of wedge 34 is monitored via measuring devices 430, 440. If the wedge has not moved by at least a predetermined amount, then the force can be increased by a selected amount. The wedge 34 can be continuously or frequently monitored for movement by measuring devices 430, 440. This process can be repeated until the wedge moves at least the predetermined amount or until a predetermined maximum amount of force has been applied. If a predetermined maximum amount of force has been applied and the wedge has not moved at least the predetermined amount (e.g., 1 mm) than it can be determined that the wedge is acceptably tight under design specifications.

Robotic manipulator 68 allows the wedge inspection system 46 to inspect wedge assembly 29 in stator 12 in situ, with rotor 14 remaining installed within stator 12. Alternatively, wedge assembly 29 can be accessed during assembly or during overhaul of generator 10, when rotor 14 is removed. Robotic manipulator 68 may be guided by an operator along the length of stator 12 to inspect wedge assemblies 29. Electrical signals may be transmitted via coupler 51 between robotic manipulator 68 and computer system 49 to control positioning of robotic manipulator 68. Coupler 51 may be an electrical cable, a wireless transmission, or other known communication pathway. Output signals from optical device 48 on robotic manipulator 68 may also be transmitted via coupler 51 between robotic manipulator 68 and computer system 49.

As used herein, the terms "first," "second," and the like, do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about 25 mm, or, more specifically, about 5 mm to about 20 mm," is inclusive of the endpoints and all intermediate values of the ranges of "about 5 mm to about 25 mm," etc.).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Further, while wedge assembly 29 has been illustrated as a stator wedge assembly, it is understood that other embodiments, such as a rotor wedge assembly, may be inspected without departing from the scope of the invention. Therefore, it is intended that the invention not be limited to the particular embodiment disclosed as the best mode contemplated for carrying out this invention, but that the invention will include all embodiments falling within the scope of the appended claims.

What is claimed is:

1. A system for determining wedge tightness in a dynamoelectric machine, the dynamoelectric machine comprising a rotor, stator and a wedge assembly having at least one wedge for retaining a coil, the system comprising:
    a force application device for applying a predetermined force to a wedge, the force applied in a substantially radial direction;
    a measuring device for measuring movement of the wedge, the measuring device comprising a first linear voltage displacement transducer (LVDT) configured to measure a distance to an adjacent core surface and a second LVDT configured to measure a distance to a wedge surface, wherein a wedge movement distance is measured relative to a surface of an adjacent core surface; and
    wherein, the system can be inserted between the rotor and the stator, and the wedge movement distance is obtained by evaluating a distance to an adjacent core surface and a distance to a surface of the wedge.

2. The system of claim 1, wherein the force application device comprises a bar jacking device.

3. The system of claim 1, wherein the system comprises at least one optical measuring device.

4. The system of claim 3, wherein a first optical measuring device measures a distance to an adjacent core surface and a second optical measuring device measures a distance to a wedge surface.

5. The system of claim 1, further comprising a robotic manipulator for positioning the system, the robotic manipulator comprising:
    a tractor section,
    a mast section affixed to the tractor section, and
    a measuring head section affixed to the mast section, the measuring head section including the measuring device.

6. The system of claim 1, wherein the wedge assembly can be evaluated or inspected in situ.

7. A dynamoelectric machine comprising:
    a rotor;
    a stator surrounding the rotor; and
    a system for determining wedge tightness insertable between the rotor and stator, the system for determining wedge tightness including:
    a force application device for applying a predetermined force to a wedge, the force applied in a substantially radial direction;
    a measuring device for measuring movement of the wedge, the measuring device comprising a first linear voltage displacement transducer (LVDT) configured to measure a distance to an adjacent core surface and a second LVDT configured to measure a distance to a wedge surface, wherein a movement distance is measured relative to a surface of an adjacent core surface;
    wherein, the system can be inserted between the rotor and the stator, and the movement distance is obtained by evaluating a distance to an adjacent core surface and a distance to a surface of the wedge.

8. The dynamoelectric machine of claim 7, wherein the force application device comprises a bar jacking device.

9. The dynamoelectric machine of claim 7, further comprising a robotic manipulator for positioning the system, the robotic manipulator comprising:
    a tractor section,
    a mast section affixed to the tractor section, and
    a measuring head section affixed to the mast section, the measuring head section including the measuring device.

10. The dynamoelectric machine of claim 7, wherein the wedge assembly is inspected or evaluated in situ.

11. A method for determining the tightness of a wedge assembly in a dynamoelectric machine, the method comprising:
    placing a system for determining wedge tightness between a stator and a rotor of the dynamoelectric machine, the placing including positioning the system for determining wedge tightness between the stator and rotor without removing the rotor from the dynamoelectric machine;
    measuring a distance to a surface of a wedge;
    measuring a distance to a core surface adjacent to the wedge;
    applying a known quantity of force to the wedge;

evaluating the difference between the distance to a surface of the wedge and the distance to a core surface to determine an amount of wedge movement;

determining if the wedge has moved at least a predetermined amount, and if the wedge has not moved at least the predetermined amount then repeating the applying and evaluating steps, if the wedge has moved at least the predetermined amount then identifying the quantity of force required to move the wedge at least the predetermined amount;

wherein the amount of force required to move the wedge at least the predetermined amount is an indication of the tightness of the wedge.

12. The method of claim 11, further comprising:

comparing the force required to move the wedge at least the predetermined amount to a design requirement value for the wedge assembly; and estimating a remaining safe operation time for the dynamoelectric machine, wherein the remaining safe operation time is based on a reduction in the force required to move the wedge at least the predetermined amount.

13. The method of claim 11, wherein the placing further includes using a robotic manipulator for positioning the system for determining wedge tightness for in situ inspection of the wedge assembly, the robotic manipulator comprising:

a tractor section for providing axial and/or circumferential locomotion of the system for determining wedge tightness about a portion of the dynamoelectric machine;

a mast section affixed to the tractor section, the mast section including a plurality of telescoping sections; and a measuring head section affixed to the mast section, the measuring head section including a measuring device.

14. A system for determining wedge tightness in a dynamoelectric machine, the dynamoelectric machine comprising a rotor, stator and a wedge assembly having at least one wedge for retaining a coil, the system comprising:

a force application device for applying a predetermined force to a wedge, the force applied in a substantially radial direction;

a measuring device for measuring movement of the wedge, the measuring device comprising a first optical measuring device configured to measure a distance to an adjacent core surface and a second optical measuring device configured to measure a distance to a wedge surface, wherein a wedge movement distance is measured relative to a surface of an adjacent core surface; and wherein, the system can be inserted between the rotor and the stator, and the wedge movement distance is obtained by evaluating a distance to an adjacent core surface and a distance to a surface of the wedge.

15. The system of claim 14, wherein the force application device comprises a bar jacking device.

16. The system of claim 14, further comprising a robotic manipulator for positioning the system, the robotic manipulator comprising:

a tractor section, a mast section affixed to the tractor section, and a measuring head section affixed to the mast section, the measuring head section including the measuring device.

17. The system of claim 14, wherein the wedge assembly can be evaluated or inspected in situ.

* * * * *